United States Patent
Djrbashian et al.

(10) Patent No.: US 10,464,429 B2
(45) Date of Patent: Nov. 5, 2019

(54) CHARGING TERMINAL CAP PROVIDING CHARGING CORD MANAGEMENT

(71) Applicant: Karma Automotive, LLC, Costa Mesa, CA (US)

(72) Inventors: Edward Djrbashian, Glendale, CA (US); Jake Iverson, Rancho Santa Margarita, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 121 days.

(21) Appl. No.: 15/140,361

(22) Filed: Apr. 27, 2016

(65) Prior Publication Data

US 2017/0313199 A1    Nov. 2, 2017

(51) Int. Cl.
| | |
|---|---|
| *H02J 7/00* | (2006.01) |
| *H02J 7/04* | (2006.01) |
| *B60L 11/18* | (2006.01) |
| *B60L 53/16* | (2019.01) |

(52) U.S. Cl.
CPC .......... *B60L 11/1818* (2013.01); *B60L 53/16* (2019.02); *H02J 7/0042* (2013.01); *Y02T 10/7005* (2013.01); *Y02T 10/7072* (2013.01); *Y02T 90/14* (2013.01)

(58) Field of Classification Search
USPC ........................................ 320/109, 107, 108
See application file for complete search history.

(56) References Cited

U.S. PATENT DOCUMENTS

| | | | |
|---|---|---|---|
| 2,518,071 A | 8/1950 | Rushworth | |
| 3,993,860 A | 11/1976 | Snow | |
| 4,123,012 A | 10/1978 | Hough | |
| 4,861,945 A | 8/1989 | Buck | |
| 6,142,405 A | 11/2000 | Black | |
| 6,171,118 B1 * | 1/2001 | Witkowski ........... | H01R 13/447 439/142 |
| 6,234,418 B1 * | 5/2001 | Donaldson ............. | B65H 75/28 191/12.2 R |
| 6,433,274 B1 * | 8/2002 | Doss ...................... | H01R 13/72 174/50 |
| 7,399,199 B2 * | 7/2008 | Symons ................. | H01R 13/72 439/242 |
| 8,103,977 B2 | 1/2012 | Taoka | |
| 8,651,460 B2 * | 2/2014 | Callahan .................. | H02G 3/12 174/153 G |
| 8,752,238 B2 | 6/2014 | Sever | |
| 2011/0037429 A1 * | 2/2011 | DeBoer ............... | B60L 11/1816 320/109 |
| 2011/0149455 A1 * | 6/2011 | Ueno .................... | B60L 3/0069 361/87 |
| 2011/0169447 A1 * | 7/2011 | Brown .................. | B60L 3/0069 320/109 |

(Continued)

*Primary Examiner* — Alexis B Pacheco
(74) *Attorney, Agent, or Firm* — Gordon & Rees LLP

(57) ABSTRACT

There is provided a cap for covering a receptacle enclosing charge terminals of a charge handle connected to a charging cord for providing electricity from a power source. The cap comprises a base member including a casing, the casing extending from the base member providing a hollow cavity for covering the receptacle enclosing the charge terminals of the charge handle, and two arms extending from the base member in a different direction from the casing, wherein the two arms are configured to receive the charging cord being coiled therebetween.

15 Claims, 14 Drawing Sheets

(56) References Cited

U.S. PATENT DOCUMENTS

| | | | |
|---|---|---|---|
| 2012/0062385 A1* | 3/2012 | Wiesemann | B60L 3/0069 |
| | | | 340/635 |
| 2012/0202365 A1* | 8/2012 | Ichio | H01R 13/5213 |
| | | | 439/131 |
| 2012/0206100 A1* | 8/2012 | Brown | B60L 3/0069 |
| | | | 320/109 |
| 2015/0042276 A1* | 2/2015 | Biedrzycki | B60L 11/1809 |
| | | | 320/109 |
| 2016/0185244 A1* | 6/2016 | Baxter | B60L 3/0023 |
| | | | 320/109 |

\* cited by examiner

CHARGING TERMINAL CAP PROVIDING CHARGING CORD MANAGEMENT

BACKGROUND

In the last decade or so, the sales and popularity of electric or hybrid vehicles have continued to grow significantly due to fuel efficiency and carbon emission concerns. Such vehicles now represent a noticeable percentage of cars being sold all over the world. To power their propulsion systems, electric or hybrid vehicles carry rechargeable batteries for use over a sustained period of time. To recharge these batteries, manufacturers provide a charger for each vehicle. These chargers come in a variety of shapes, sizes and functionalities depending on the cars and car manufacturers, and are typically portable.

FIG. 1 illustrates conventional charger 100 adapted to plug into charging port 102 of an electric vehicle. As shown, charger 100 includes charge handle 101 and cord 106, which is connected to charge handle 101 at one end and to an electric plug (not shown) at the other end. Charge handle 101 includes receptacle 104 and charge terminals 105. Receptacle 104 is a casing for enclosing charge terminals 105. Charge terminals 105 are configured to plug into charging port 102 of the electric vehicle for supplying electricity to the electric vehicle.

FIG. 2 illustrates conventional cap 230 for covering charge terminals 205, which correspond to charge terminals 105 of FIG. 1. Cap 230 has a cylindrical shell that receives, encloses and covers charge terminals 205 located in receptacle 204 of charge handle 201 to safeguard charge terminals 205 against dirt, liquids, and damage.

SUMMARY

The present disclosure is directed to a charging terminal cap providing charging cord management, substantially as shown in and/or described in connection with at least one of the figures, as set forth more completely in the claims.

DETAILED DESCRIPTION

Figure 1:
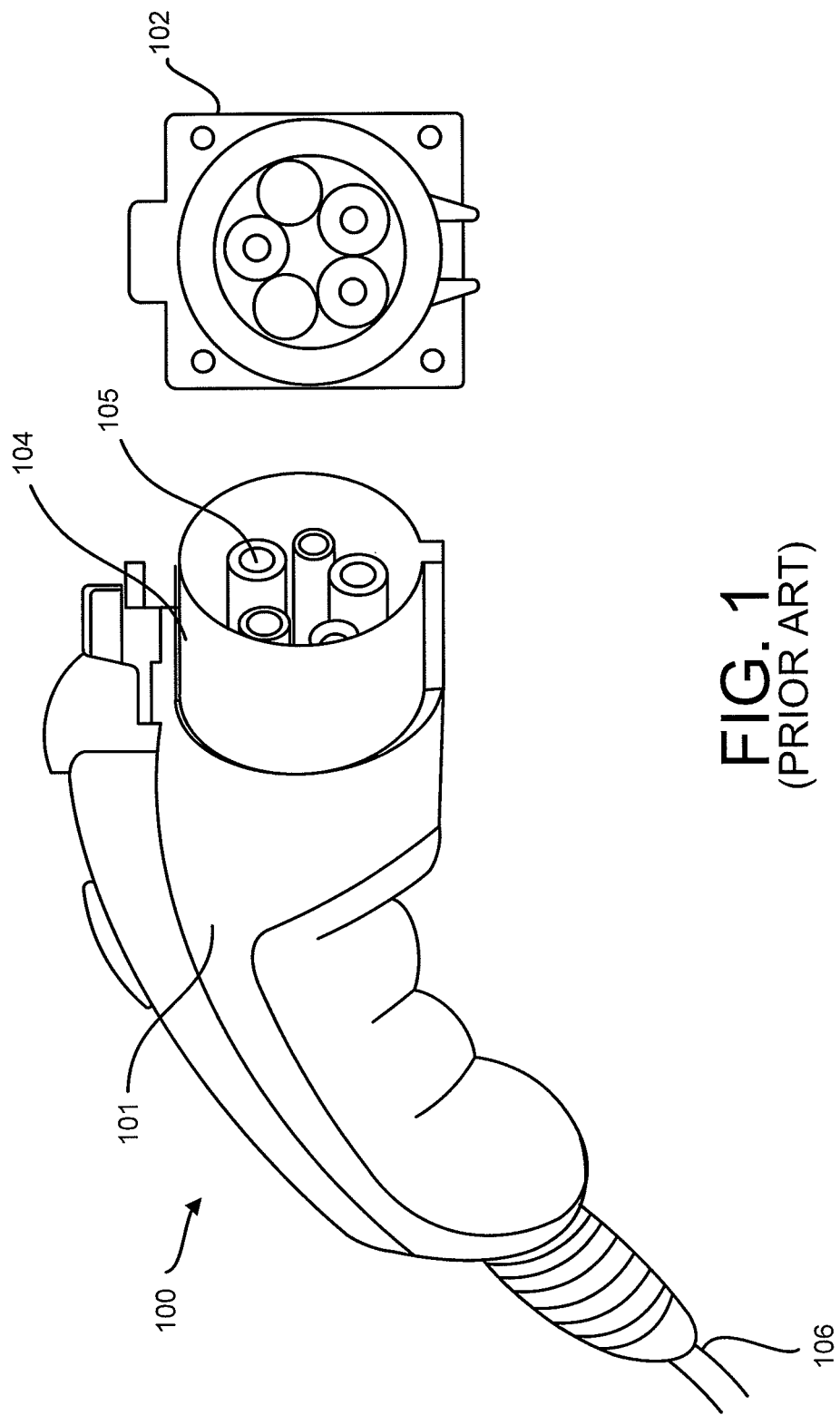
FIG. 1 illustrates a conventional charge handle and a charging port of an electric vehicle.
Figure 2:
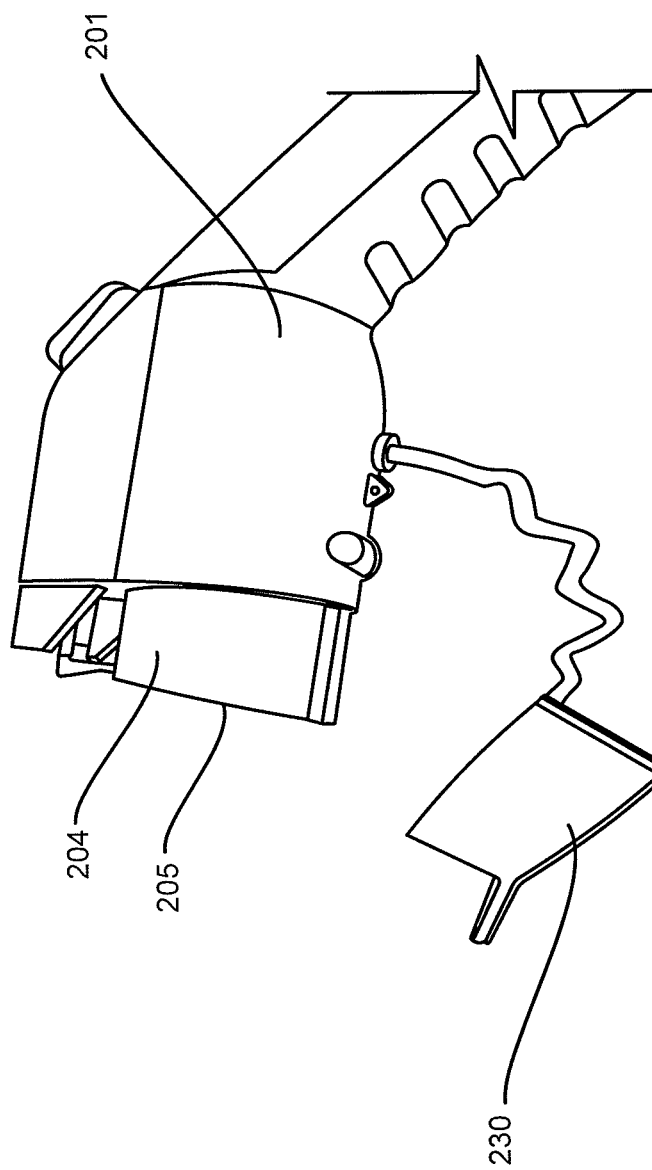
FIG. 2 illustrates the conventional charge handle of FIG. 1 along with a conventional cap for covering charge terminals of the conventional charge handle.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 3A:
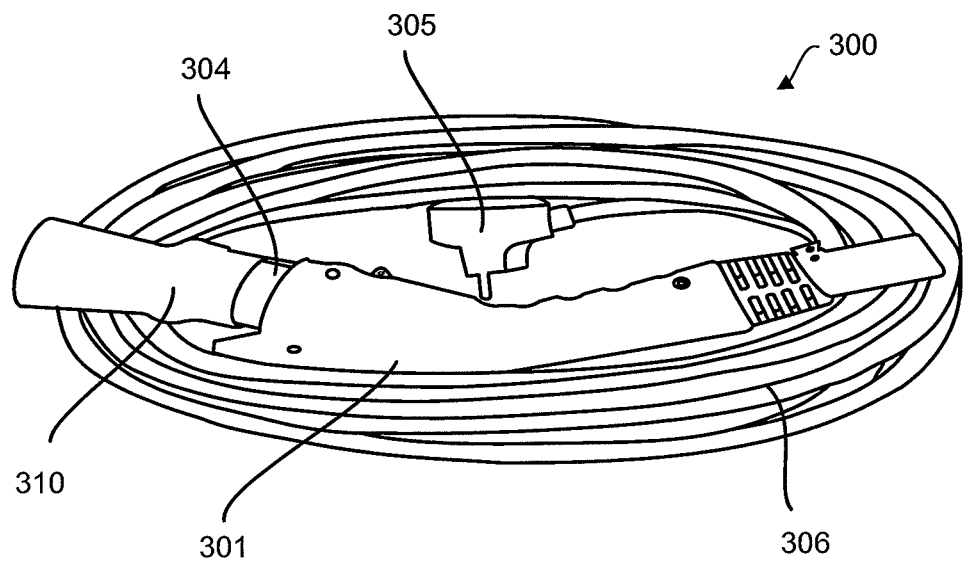
FIG. 3a illustrates an exemplary charger with a cord and a cap for covering charge terminals and managing the cord, according to one implementation of the present disclosure.

FIG. 3a illustrates charger 300, including charging cord 306, charge handle 301, electric plug 305 and cap 310, according to one implementation of the present disclosure. Charging cord 306 connects to electric plug 305 from one end and charge handle 301 from the other end, and provides electricity from a power source, such as a wall plug, to charge handle 301. Charge handle 301 includes receptacle 304 enclosing charge terminals (not shown) similar to charge terminals 105 in FIG. 1. As shown in FIG. 3a, cap 310 is not only adapted to cover receptacle 304 to protect the charge terminals located therein, but cap 310 also is configured to receive charging cord 306a for coiling.

Figure 3B:
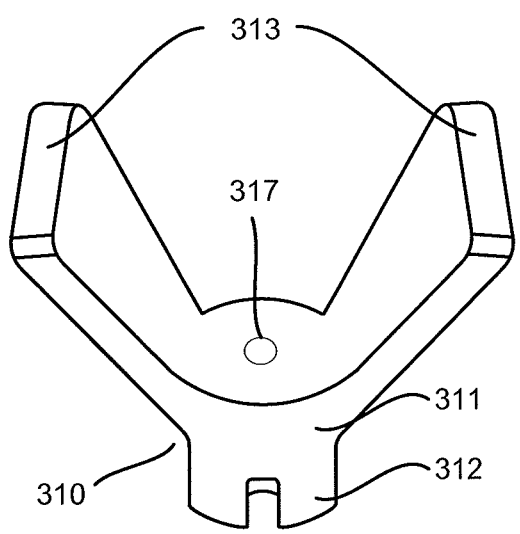
FIG. 3b illustrates the cap of FIG. 3a, according to one implementation of the present disclosure.

FIG. 3b illustrates cap 310 of FIG. 3a, according to one implementation of the present disclosure. As shown, cap 310 includes arms 313 and a base member 311 connecting arms 313 together. In one implementation, base member 311 may be cylindrical with a fixed radius across the cylinder. In another implementation, base member 311 may be a tapered cylinder in shape with different radii across the cylinder. Base member 311 further includes casing 312 that provides a hollow cavity for covering receptacle 304 enclosing the charge terminals (not shown) of charge handle 301, as shown in FIG. 3a, to protect the charge terminals against damage by liquids, contact with objects, dirt, dust, etc. As shown in FIG. 3b, arms 313 extend from base member 311 in an opposite direction from casing 312. As further shown in FIG. 3b, arms 313 extend at an increasing distance from each other and are configured to receive charging cord 306, as shown in FIG. 3a, being coiled in between arms 313. Cap 310 may also include attaching device 317, which may be a magnet, metal, or Velcro, for attaching charging cord 306 to cap 310, as further discussed below.

Figure 4A:
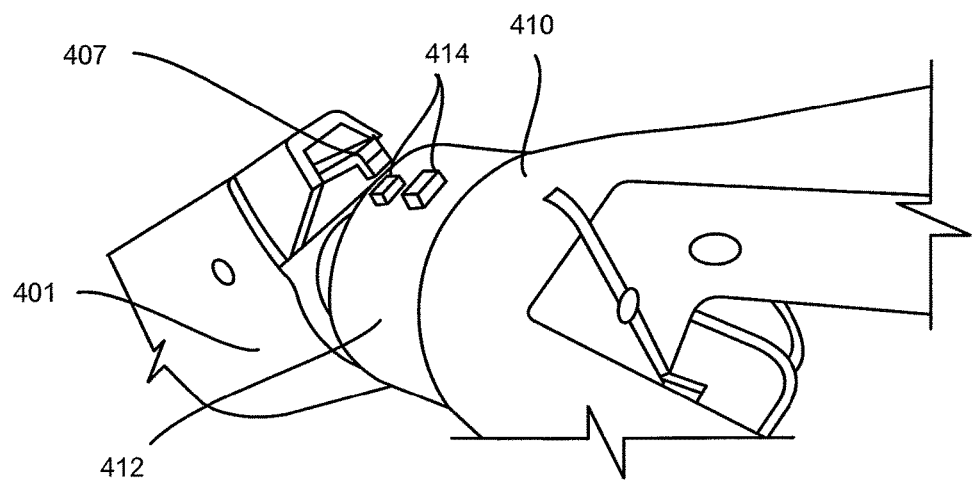
FIG. 4a illustrates an exemplary tooth located on the cap of FIG. 3b, according to one implementation of the present disclosure.
Figure 4B:
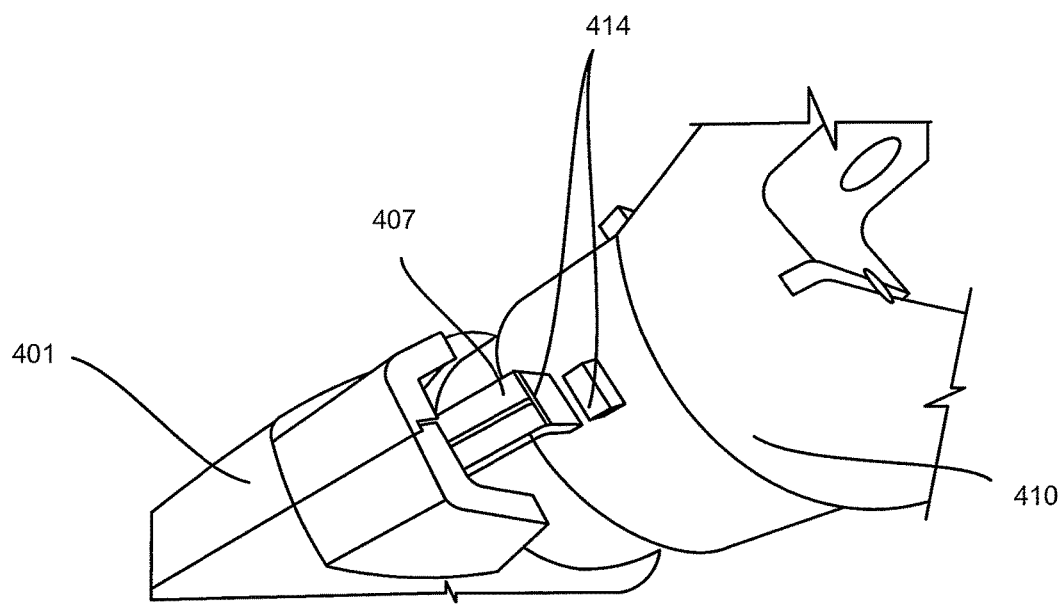
FIG. 4b illustrates the cap of FIG. 4a being clasped onto a latch located on the charge handle, according to one implementation of the present disclosure.

Turning to FIG. 4a, FIG. 4a illustrates cap 410 as well as charge handle 401, according to one implementation of the present disclosure. Cap 410 includes one or more teeth 414 configured to clasp onto latch 407 of charge handle 401. As shown in FIG. 4a, teeth 414 may be box-shaped bumps on casing 412 of cap 410, and may come in different shapes and sizes. Clasping teeth 414 onto latch 407 keeps cap 410 in place and prevents cap 410 from falling after being placed on charge handle 401. FIG. 4b illustrates how latch 407 is extended and placed in between teeth 414 for keeping cap 410 on charge handle 401.

Figure 5A:
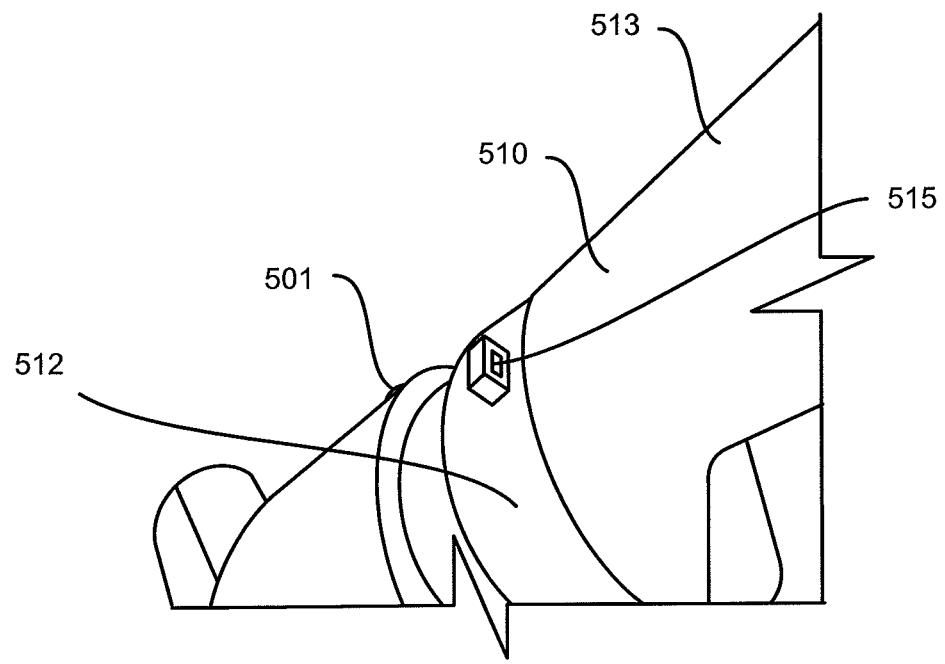
FIG. 5a illustrates an exemplary catch of the cap of FIG. 3b, according to one implementation of the present disclosure.
Figure 5B:
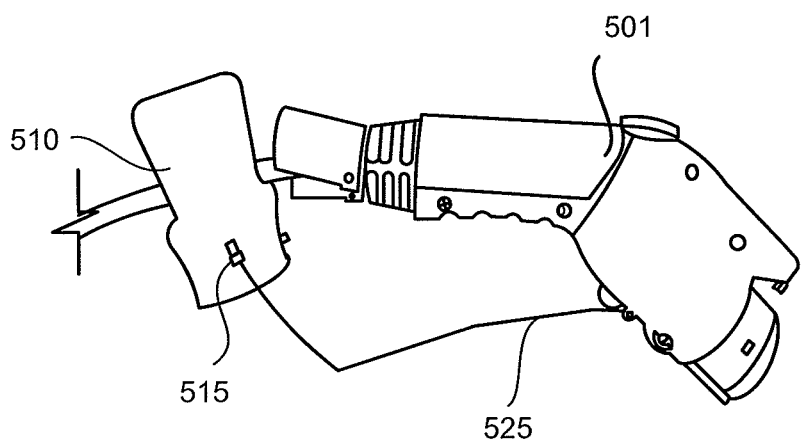
FIG. 5b illustrates the catch of FIG. 5a attached to a string connected to the charge handle, according to one implementation of the present disclosure.

FIG. 5a illustrates cap 510, which includes catch 515 configured to attach to a string (not shown) connected to charge handle 501, according to one implementation of the present disclosure. As shown in FIG. 5a, catch 515 may be a square-shaped extension with an opening for a string to go through. In another implementation, catch 515 may have a different shape or size, and may be located on other parts of cap 510. For instance, catch 515 may be a round-shaped extension with a circular opening and may be located on one of arms 513 of cap 510. FIG. 5b illustrates a different view of the implementation of FIG. 5a, including charge handle 501 and string 525 with one end attached to charge handle 501 and the other end attached to catch 515 of cap 510. FIG. 5b illustrates how cap 510 is attached to charge handle 501 using string 525, which prevents cap 510 from being separated from charge handle 501.

Figure 6A:
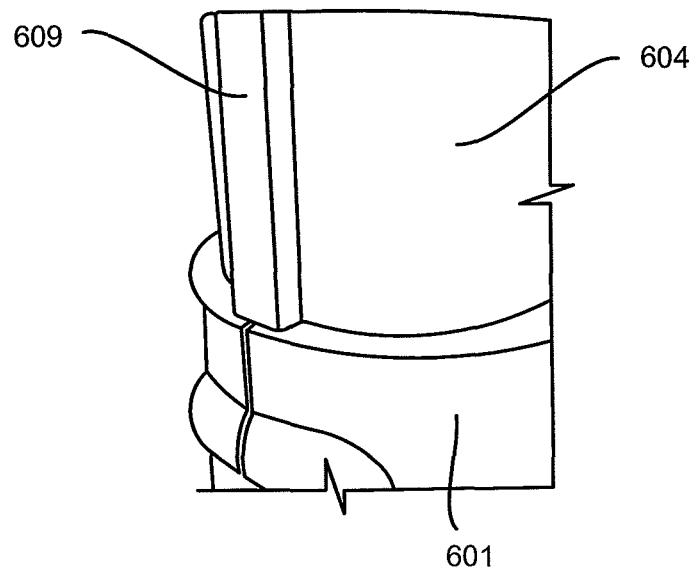
FIG. 6a illustrates the charge handle of FIG. 3b with a tab located on a receptacle of the charge handle, according to one implementation of the present disclosure.
Figure 6B:
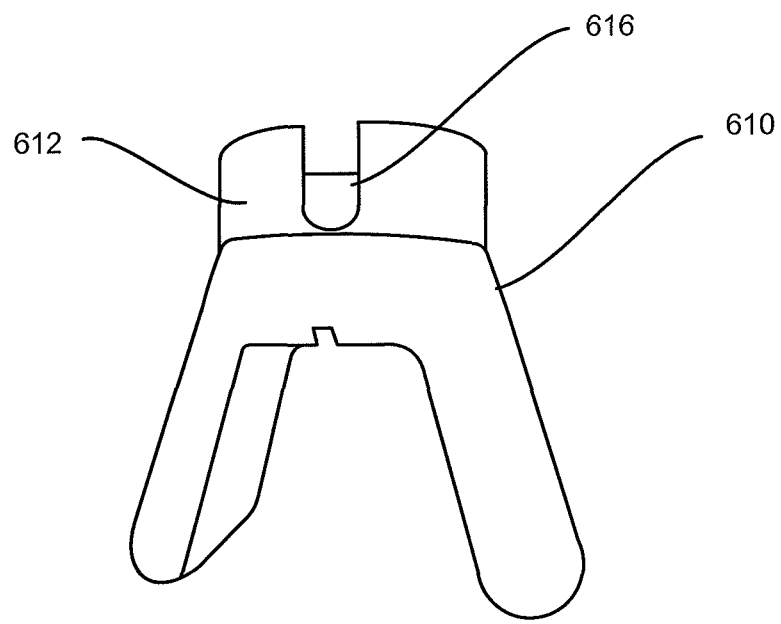
FIG. 6b illustrates an exemplary recess of the cap of FIG. 3b, according to one implementation of the present disclosure.

Turning now to FIG. 6a, FIG. 6a illustrates charge handle 601, according to one implementation of the present disclosure. Charge handle 601 includes receptacle 604 with tab 609 located on receptacle 604. FIG. 6b illustrates cap 610 including recess 616, according to one implementation of the present disclosure. Recess 616 is configured to receive tab 609 located on receptacle 604 of charge handle 601 of FIG. 6a. As shown in FIG. 6b, recess 616 may be a rectangular hollow cavity in casing 612 for tab 609 to slide through.

Figure 7A:
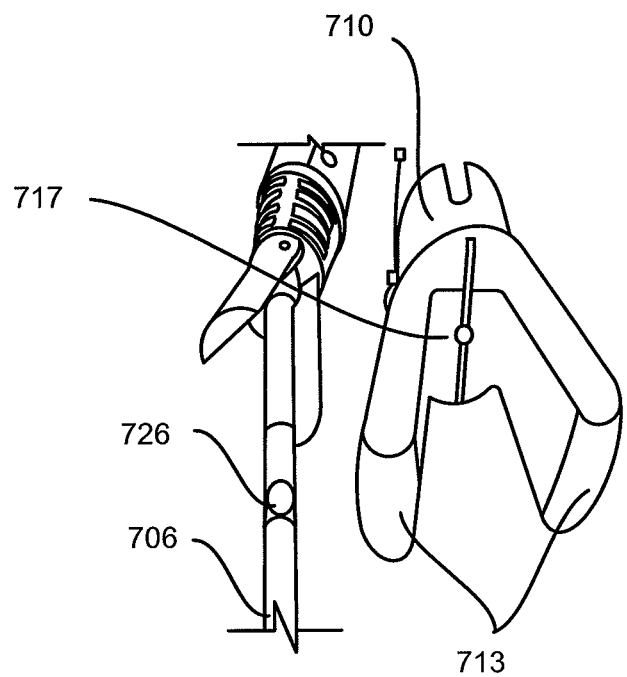
FIG. 7a illustrates an exemplary attaching device of the cap of FIG. 3b, according to one implementation of the present disclosure.

FIG. 7a illustrates cap 710 and charging cord 706, according to one implementation of the present disclosure. As shown, cap 710 includes first attaching device 717 located on base member 711. As further shown in FIG. 7a, charging cord 706 also includes second attaching device 726. In one implementation, first attaching device 717 may be a magnet configured to attract second attaching device 726, which may be either a magnet with an opposite polarity or a piece of metal. In another implementation, first attaching device 717 may be a metal while second attaching device 726 may be a magnet configured to attract first attaching device 717. In yet another implementation, first attaching device 717 and second attaching device 726 may be Velcro, where one is a hook and the other is a loop. First attaching device 717 and second attaching device 726 may, in one implementation, be integrated into cap 710 and charging cord 706, respectively. In another implementation, one or both of first attaching device 717 and second attaching device 726 may be separate elements that are attachable to cap 710 and charging cord 706, respectively. In such an implementation, first attaching device 717 and second attaching device 726 may be separated from cap 710 and charging cord 706 and used again by attaching them back.

Figure 7B:
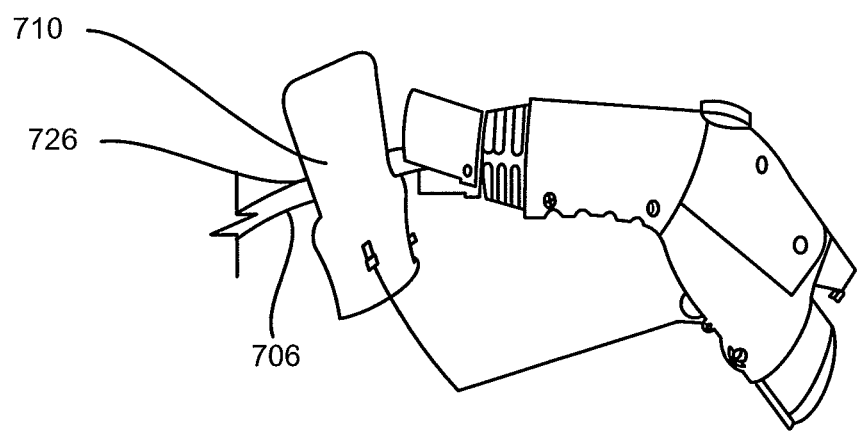
FIG. 7b illustrates the cap of FIG. 7a being attached to the charging cord using the attaching device of FIG. 7a, according to one implementation of the present disclosure.

FIG. 7b illustrates cap 710 being attached to charging cord 706 using the first attaching device 717 and the second attaching device 726 of FIG. 7a, according to one implementation of the present disclosure. As a result, cap 710 is secured in a fixed position on charging cord 706 and is not free to move.

Figure 8:
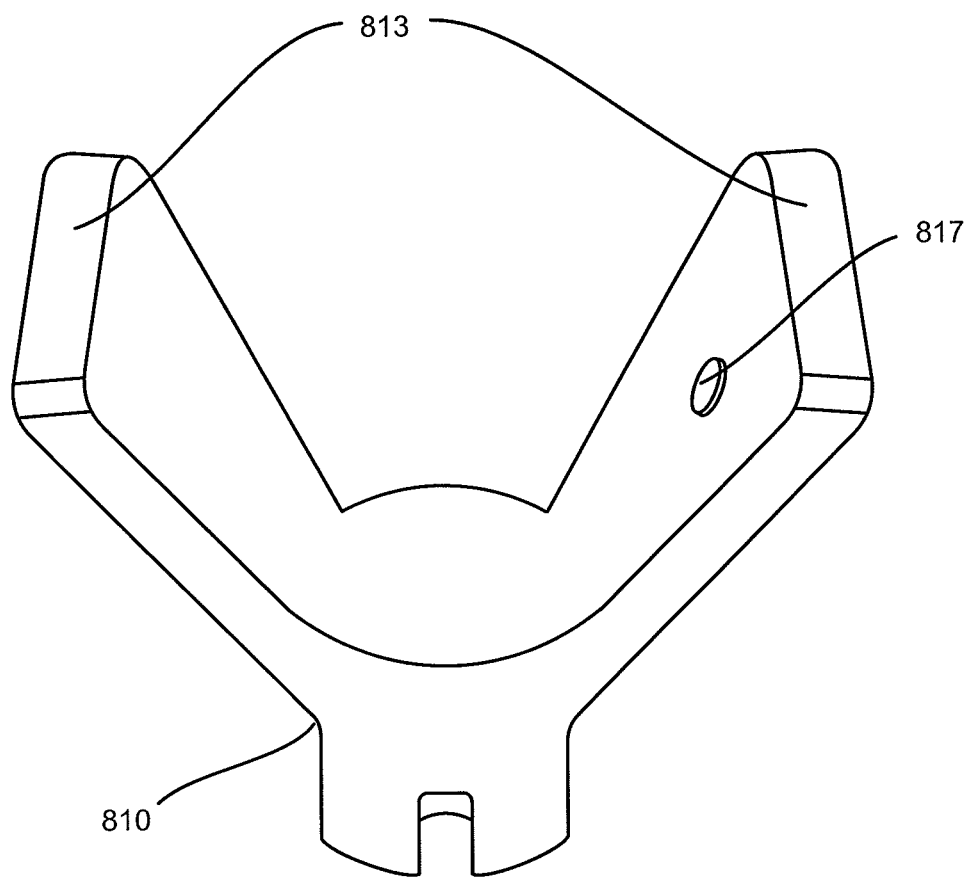
FIG. 8 illustrates another exemplary attaching device of the cap of FIG. 3b, according to one implementation of the present disclosure.

FIG. 8 illustrates exemplary cap 810, according to one implementation of the present disclosure. As shown in FIG. 8, first attaching device 817 is located on one of arms 813 of cap 810. In such an implementation, similar to FIG. 7b, a second attaching device of the charging cord may attach to first attaching device 817 to keep cap 810 in place. In addition, first attaching device 817 may also be used to keep the charging cord in place after the charging cord is coiled in between arms 813. As such, the charging cord may include a plurality of second attaching device, one closer to the charge handle and another closer to the electric plug of the charge handle, which may keep the last wrap of the charging cord in place.

Figure 9A:
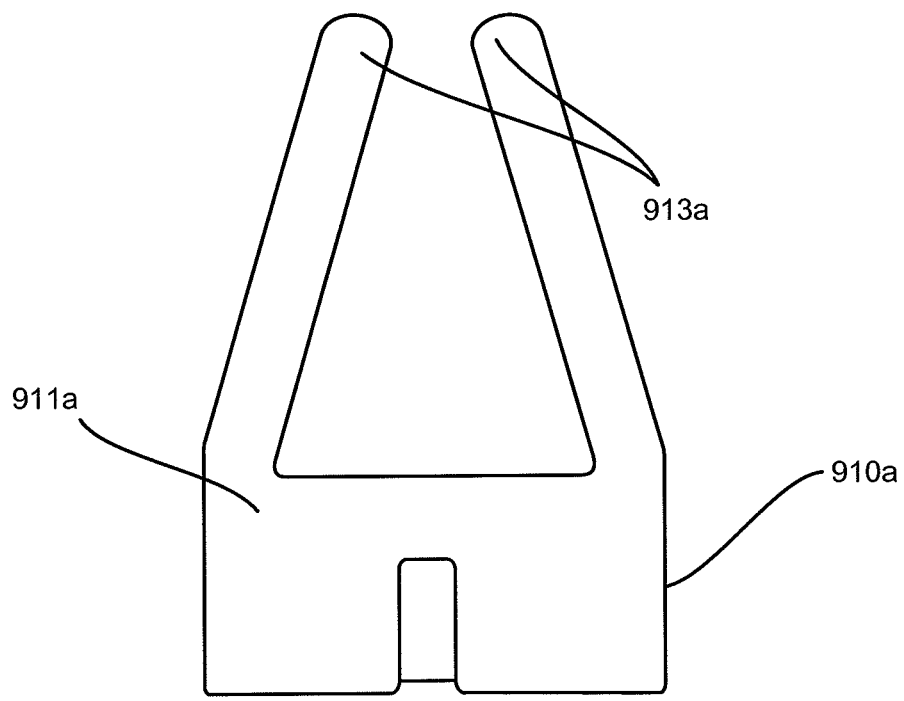
FIG. 9a illustrates an exemplary cap with arms extending at a decreasing distance from each other, according to one implementation of the present disclosure.

FIG. 9a illustrates exemplary cap 910a, according to one implementation of the present disclosure. As shown in FIG. 9a, arms 913a of cap 910a extend from base member 911a at a decreasing distance from each other, effectively creating acute angles with base member 911a. In such an implementation, the charging cord coiled between arms 913a is less likely to uncoil or fall out of cap 910a, because of the small opening created by arms 913a.

Figure 9B:
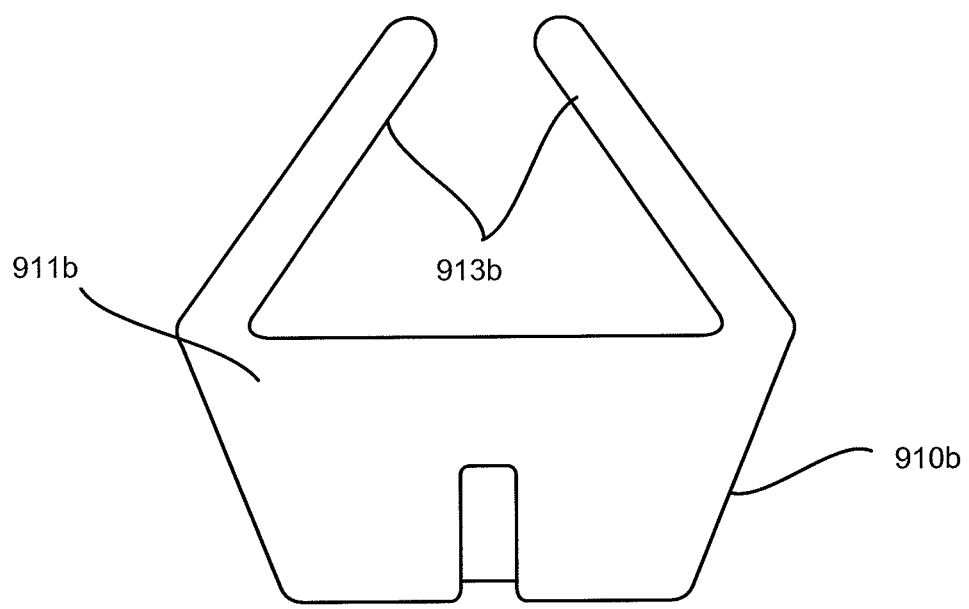
FIG. 9b illustrates an exemplary cap with arms extending at a decreasing distance from each other and a wider base member, according to one implementation of the present disclosure.

FIG. 9b illustrates exemplary cap 910b, according to one implementation of the present disclosure. As shown in FIG. 9b, cap 910b has arms 913b extending from base member 911b at a decreasing distance from each other, as well a base member 911b that is wider than receptacle of cap 910b. The wider base member 911b provides more space for fitting long charging cords, which require more room for coiling the charging cord.

Figure 10:
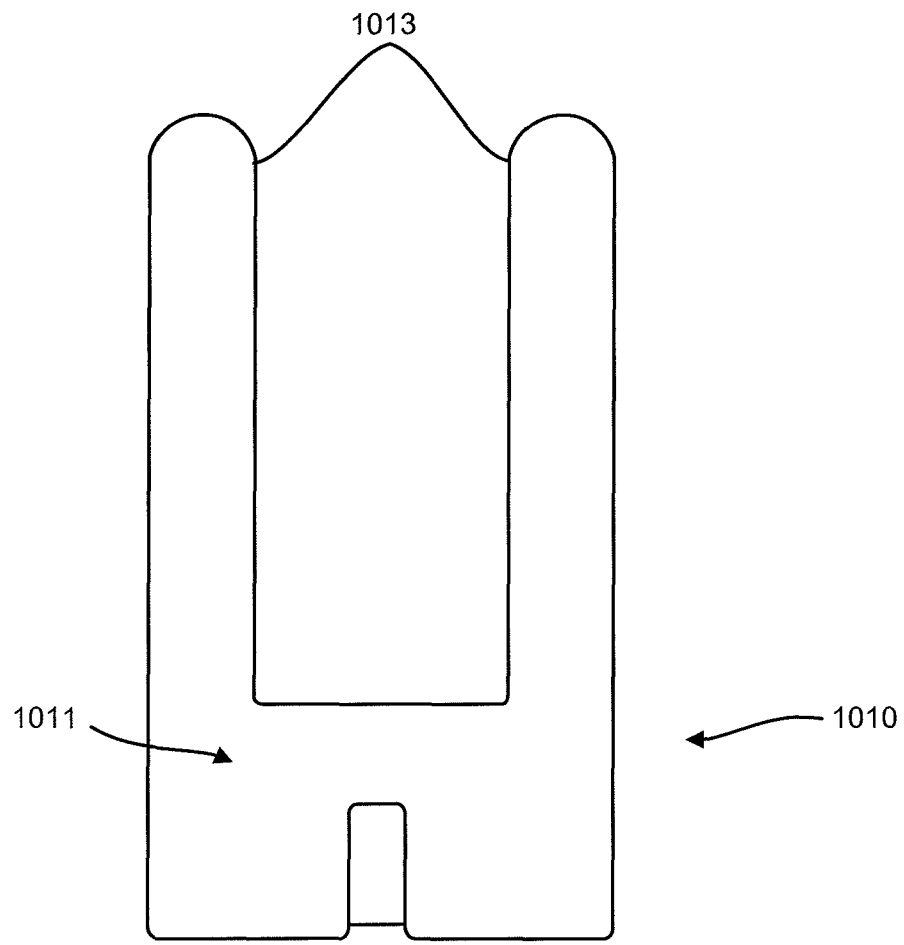
FIG. 10 illustrates an exemplary cap with arms extending at a constant distance from each other, according to one implementation of the present disclosure.
Figure 11:
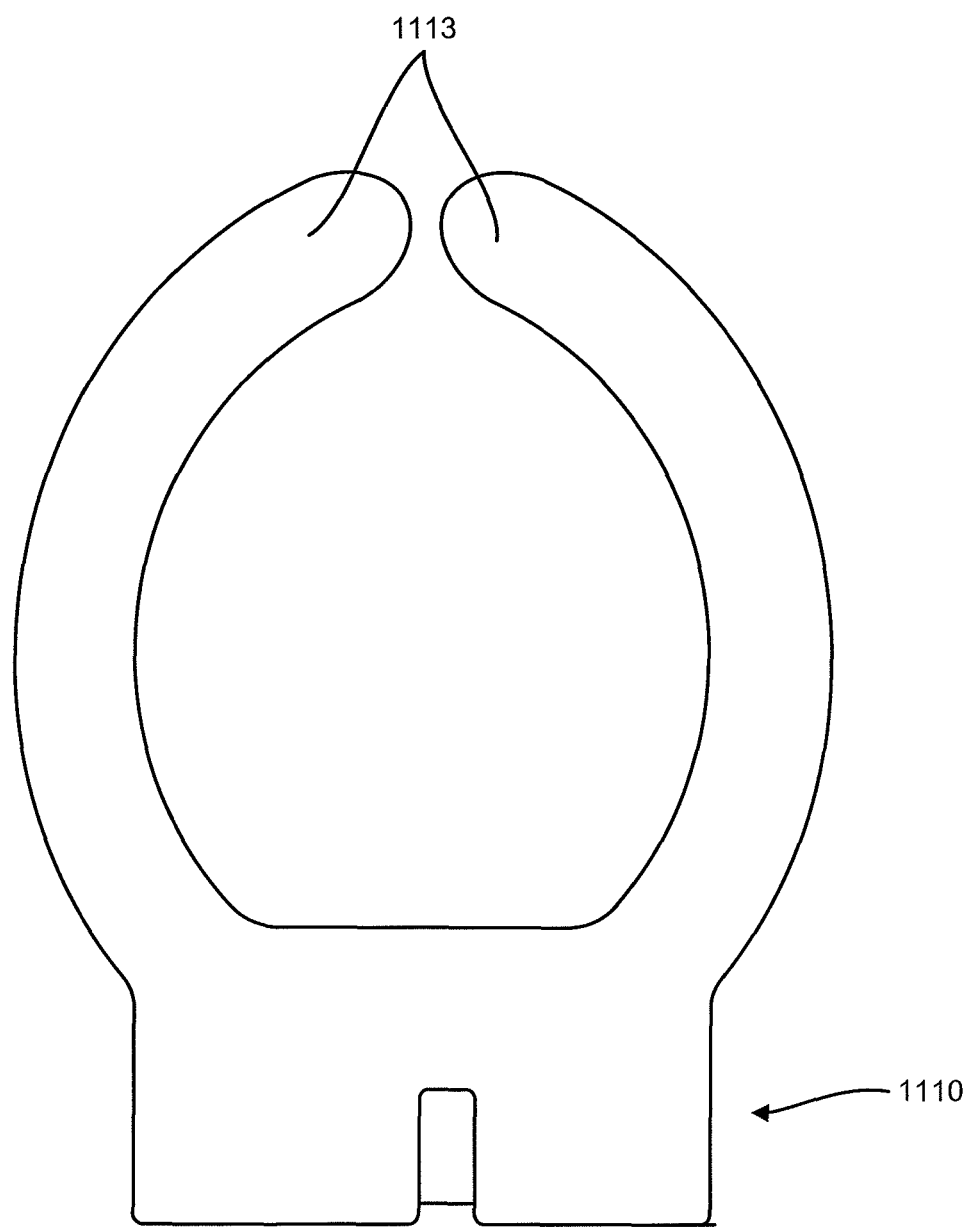
FIG. 11 illustrates an exemplary cap with semi-circular arms, according to one implementation of the present disclosure.

FIG. 10 illustrates exemplary cap 1010, according to one implementation of the present disclosure. As shown in FIG. 10, cap 1010 has arms 1013 extending from base member 1011 at a constant distance from each other, effectively forming right angles with base member 1011. FIG. 11 illustrates exemplary cap 1110, according to another implementation of the present disclosure. As shown by FIG. 11, cap 1110 includes arms 1113, which have half-circle shapes and are elastic to provide flexibility. In their normal state, arms 1113 almost touch and close the opening for the charging cord to pass through for coiling. The small opening between arms 1113 helps prevent the charging cord from uncoiling. In another implementation, arms 1113 may touch at the opening therebetween entirely, leaving no room for the charging cord to pass through. In such an implementation, the elasticity or flexibility of arms 1113 allows for the charging cord to slip through by pulling arms 1113 away from each other to create an opening for passing the charging cord through when coiling. In this implementation, each time the charging cord passes through arms 1113 while being coiled, arms 1113 move back to their original position and close the opening.

Figure 12:
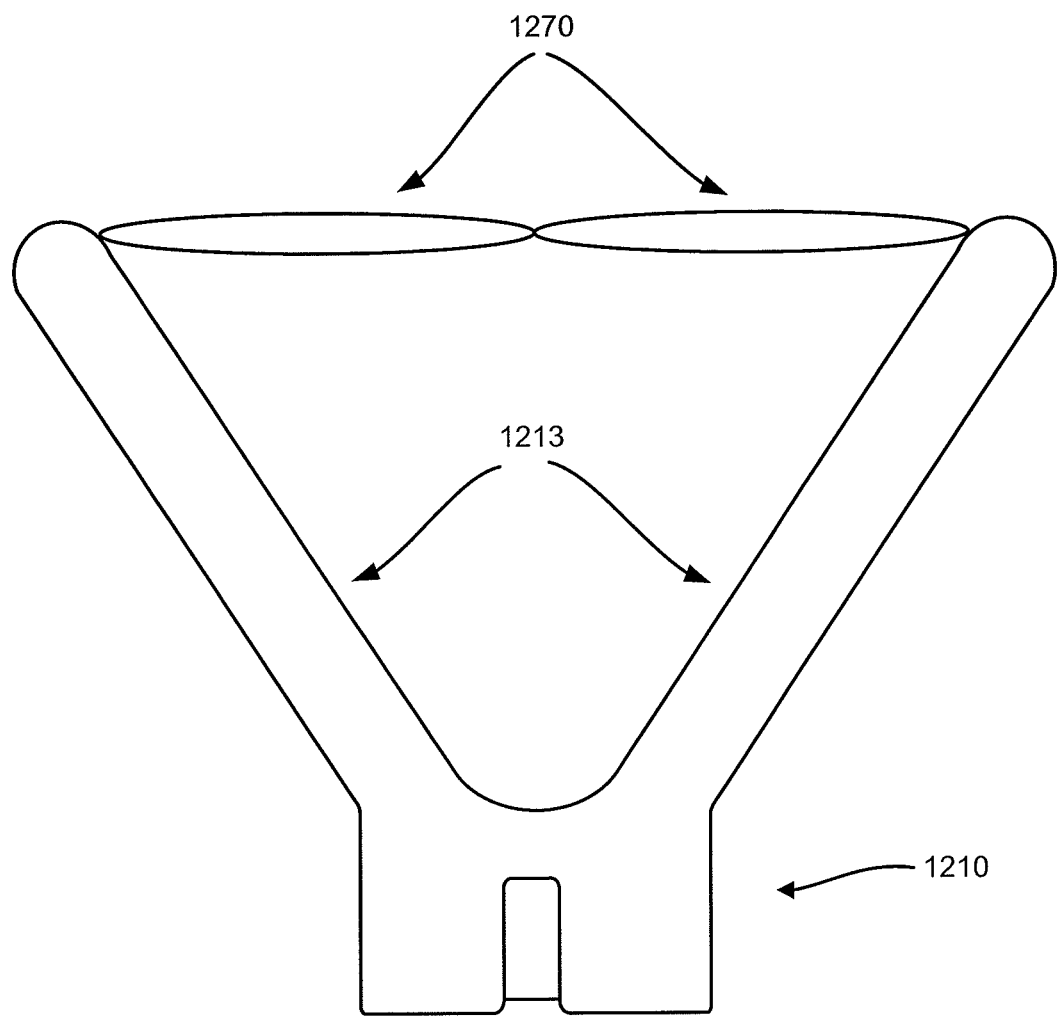
FIG. 12 illustrates an exemplary cap with flexible rubber pieces attached to the tip of the two arms of the cap, according to one implementation of the present disclosure.

FIG. 12 illustrates exemplary cap 1210, according one implementation of the present disclosure. As shown, cap 1210 has arms 1213 with rubber elements 1270 attached by the tip of arms 1213. Rubber elements 1270 may be two pieces of flexible and elastic rubber touching to entirely close the opening between arms 1213. When coiling the charging cord, each wrap of the charging cord passes through rubber elements 1270, which may flex by moving downwards and creating an opening to allow the charging cord to pass through. As rubber elements 1270 are elastic, after coiling each wrap, rubber elements 1270 revert back to their original state, as shown in FIG. 12, thereby touching and closing off the opening again.

Figure 13A:
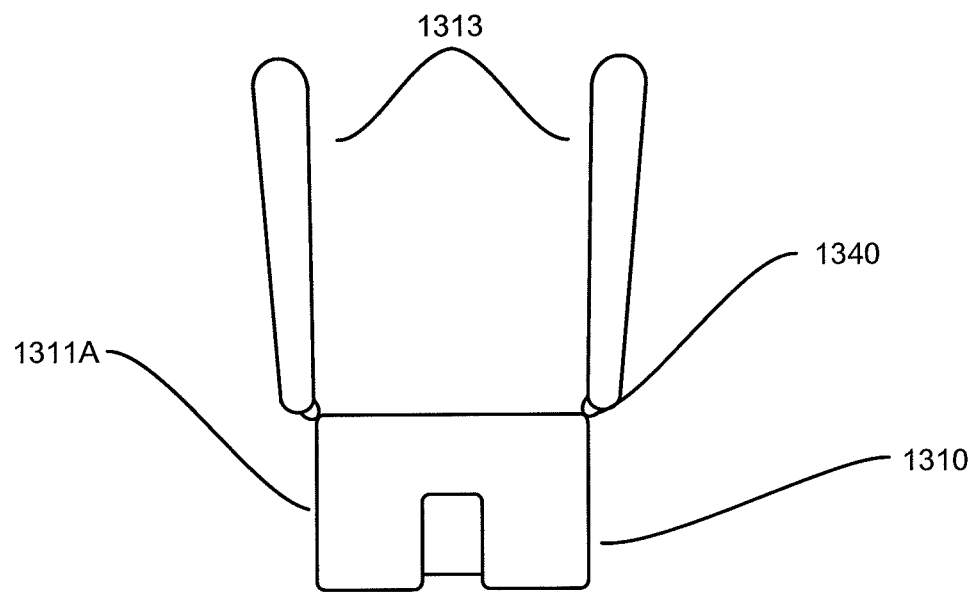
FIG. 13a illustrates an exemplary cap with pivot connections connecting arms and a base member of the cap together, according to one implementation of the present disclosure.
Figure 13B:
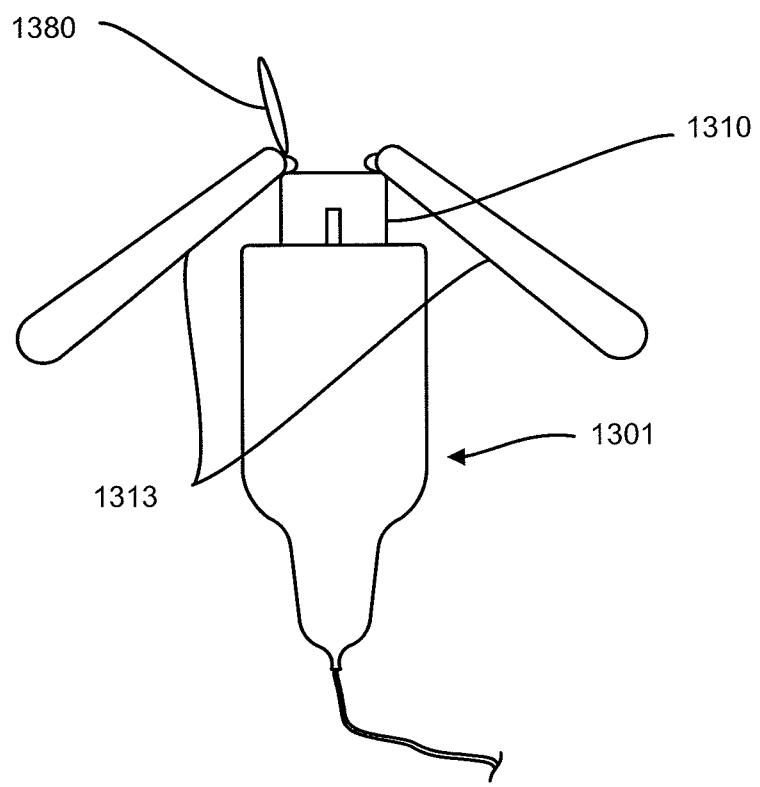
FIG. 13b illustrates the cap of FIG. 13a being placed on a charge handle, according to one implementation of the present disclosure.

FIG. 13a illustrates exemplary cap 1310, according one implementation of the present disclosure. Cap 1310 includes pivot connections 1340 connecting base member 1311 to arms 1313 and allowing arms 1313 to pivot around base member 1311. This implementation is advantageous when the charge handle is plugged into a charging port of an electric vehicle for charging while cap 1310 is attached to the charging cord using the attaching devices discussed about. As shown in FIG. 13b, arms 1313 may be folded at pivot connections 1340 and arms 1313 may point away from the vehicle while the vehicle is being charged. FIG. 13b further illustrates cover portion 1380 attached to one of arms 1313, such that when the one of arms 1313 is folded, cover portion 1380 moves away to uncover charge terminals (not shown) of charge handle 1301. Also, when the one of arms 1313 is unfolded, cover portion 1380 moves back in place to cover charge terminals (not shown) of charge handle 1301. The implementation of FIG. 13b allows cap 1310 to remain on charge handle 1301 at all times, even when the charger is being used for charging.

Figure 14:
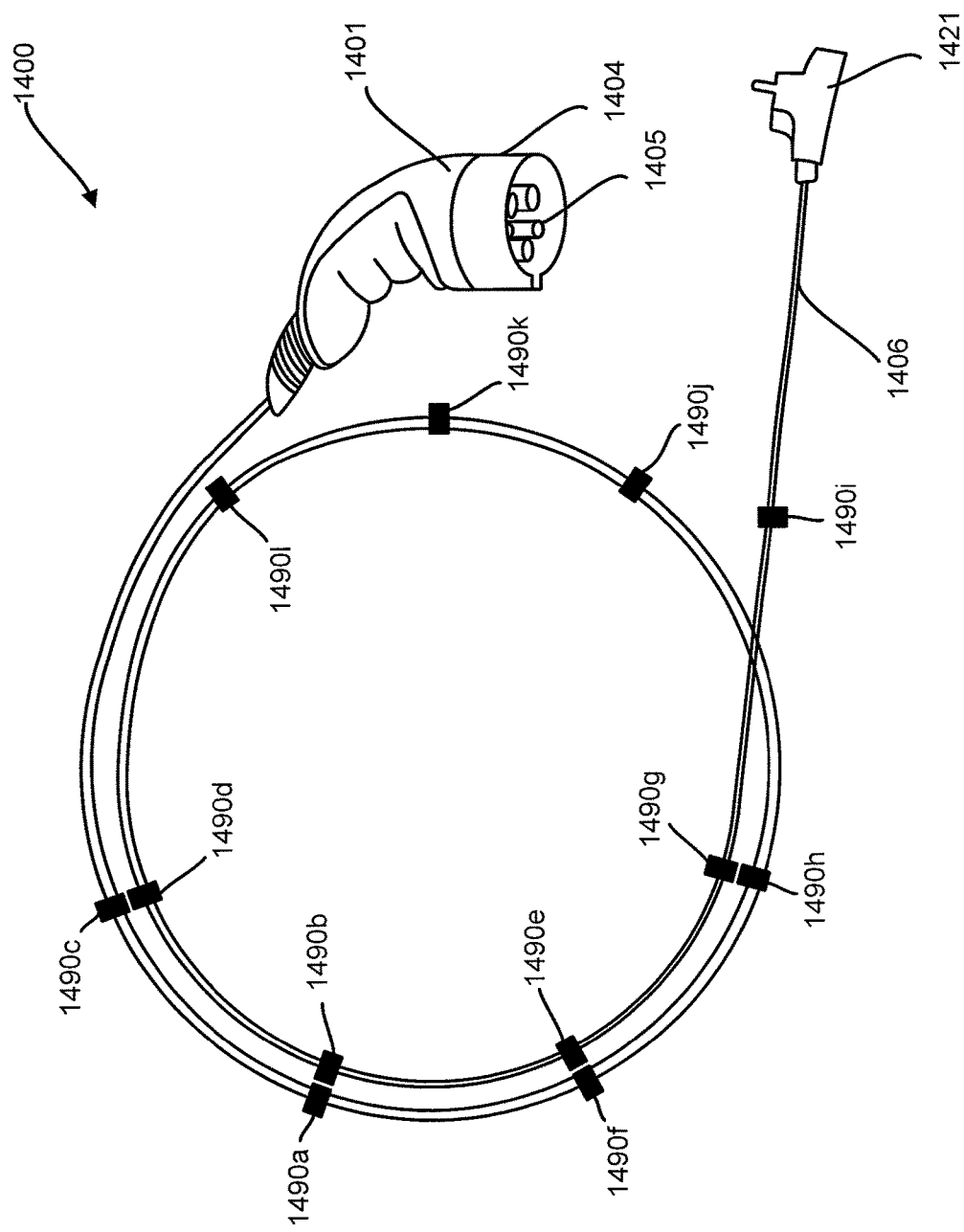
FIG. 14 illustrates exemplary attaching components located on a charging cord connected to a charge handle, according to one implementation of the present disclosure.

FIG. 14 illustrates charging device 1400, according to one implementation of the present disclosure. Charging device 1400 includes charge handle 1401, including charge terminals 1405 and receptacle 1404. Charging device 1400 further includes charging cord 1406 with one end connected to charge handle 1401 and the other end connected to electric plug 1421. As shown, charging cord 1406 of FIG. 14 includes a plurality of attaching devices or components 1490a-1490l located on charging cord 1406 each separated by a distance from another.

As shown in FIG. 14, each of attaching components 1490a-1490l is configured to attach to another one of attaching components 1490 to enable coiling charging cord 1406. For instance, attaching components 1490a, 1490c, 1490f and 1490h are configured to attach to attaching components 1490b, 1490d, 1490e and 1490g, respectively. In one implementation, attaching components 1490a-1490l may all be magnets with opposite polarities to attract one another. In another implementation, some of attaching components 1490a-1490l may be magnets while others may be made of metal. For instance, attaching component 1490a may be a magnet while attaching component 1490b may be a metal. In yet another implementation, attaching components 1490a-1490l may be Velcro. For instance, attaching component 1490a may be a hook while attaching component 1490b may be a loop. In another implementation, opposite attaching components 1490a-1490l may snap into each other. Furthermore, attaching components 1490a-1490l may, in one implementation, be integrated into charging cord 1406. In another implementation, one or more of attaching components 1490 may be separate elements that are attachable to and removable from charging cord 1406.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A cap for covering a receptacle enclosing charge terminals of a charge handle having a handle portion connected to the receptacle at a first end and connected to a charging cord at a second end for providing electricity from a power source, the cap comprising:
   a base member including a casing, the casing extending outwardly from a first side of the base member providing a hollow cavity for covering the receptacle enclosing the charge terminals of the charge handle;
   two arms extending outwardly from a second side of the base member being directly behind the first side, wherein the two arms are configured to receive the charging cord therebetween when the cap is covering the receptacle of the charge handle and when the charging cord is being coiled and wrapped around the second end of the charge handle and the first end of the charge handle; and
   wherein the handle portion includes one or more handle arms extending outwardly at the second end for supporting the charging cord when the charging cord is being coiled and wrapped around the second end of the charge handle.

2. The cap of claim 1, wherein the casing of the base member includes a recess configured to receive a tab located on the receptacle of the charge handle.

3. The cap of claim 1, wherein the casing of the base member includes a tooth configured to clasp onto a latch on the charge handle.

4. The cap of claim 1, wherein the casing of the base member includes a catch configured to attach to a string connected to the charge handle.

5. The cap of claim 1, wherein the two arms extend from the base member at an increasing distance from each other.

6. The cap of claim 1, wherein the two arms extend from the base member at a constant distance from each other.

7. The cap of claim 1, wherein the two arms extend from the base member at a decreasing distance from each other.

8. The cap of claim 1 further comprising:
   pivot connections, wherein each of the pivot connections connect each of the two arms to the base member of the cap.

9. The cap of claim 1 further comprising:
   a first attaching device for attaching the cap to a second attaching device on the charging cord.

10. The cap of claim 9, wherein the first attaching device is located on the base member in between the two arms.

11. The cap of claim 9, wherein the first attaching device is located on at least one of the two arms.

12. The cap of claim 9, wherein the first attaching device is a magnet.

13. The cap of claim 9, wherein the first attaching device comprises of a hook and a loop.

14. The cap of claim 9, wherein the first attaching device is integrated into the cap.

15. The cap of claim 9, wherein the first attaching device is separable from the cap.

\* \* \* \* \*